United States Patent [19]
McLaren

[11] 3,711,712
[45] Jan. 16, 1973

[54] METHOD AND DEVICE FOR LOCATING A FOREIGN BODY IN HUMAN EYE

[76] Inventor: Richard H. McLaren, 385 Los Altos Drive, Pocatello, Idaho 83201

[22] Filed: Dec. 28, 1970

[21] Appl. No.: 101,525

[52] U.S. Cl. ................... 250/59, 250/61.5, 250/65 R
[51] Int. Cl. ............................................ G03b 41/16
[58] Field of Search ...................... 250/59, 61.5, 65 R

[56] References Cited

UNITED STATES PATENTS

| | | | |
|---|---|---|---|
| 581,540 | 4/1897 | Dennis | 250/59 |
| 3,297,871 | 1/1967 | Nathanson | 250/65 |

Primary Examiner—Archie R. Borchelt
Assistant Examiner—C. E. Church
Attorney—Shlesinger, Fitzsimmons & Shlesinger

[57] ABSTRACT

In one embodiment two right-angular intersecting radiopaque wires are secured to one leg of a transparent, right-angular frame, which is adapted to be mounted by an operator on the up-turned face of a supine patient, so that the intersection of the wires registers with the axis of the pupil of the injured eye. The other leg of the frame carries an arcuate wire, which the operator aligns with the foremost arc of this pupil, and a fourth wire spaced rearwardly of the arcuate wire and disposed to extend at right angles of the pupil axis. Vertical and cross table X-rays are then taken to provide two roentgenograms on which images of the wires and the foreign body in the eye are superimposed. By measuring the offset of the foreign body images from, respectively, the images of the two intersecting wires, and the image of the fourth wire, the operator can determine mathematically if the body lies within the optic globe of the eye, in which case it would have to be removed.

5 Claims, 7 Drawing Figures

INVENTOR.
RICHARD H. McLAREN

METHOD AND DEVICE FOR LOCATING A FOREIGN BODY IN HUMAN EYE

This invention relates to radiology, and more particularly to a novel method and device for use by radiologists, and the like, in accurately determining the location of a foreign body in a person's eye. Even more particularly, the invention relates to a device for use in conjunction with X-ray machines to produce special roentgenograms for determining the exact location of a foreign body relative to the optic globe in a human's eye.

It is conventional to utilize X-ray machines for detecting the presence of foreign bodies or growths within a person's eye. Merely detecting the presence of the foreign body or growth, however, is not enough. If such a foreign body is present in the eye, it is essential also to determine whether or not the body lies within the optic globe of the eye, because if it does, then surgical intervention is necessary.

Because of the need to resort to the use of air injection or anesthesia, procedures heretofore used for locating the exact position of such a foreign body in a person's eye normally had to be performed by a skilled physician. Moreover, the growth localizing or locating devices heretofore used with known procedures have been cumbersome, inaccurate, or have necessitated the manipulation of the person's eye in some manner in order to detect the foreign body therein.

It is an object of this invention to provide an improved, relatively simple method for accurately locating a foreign body or growth in a person's eye. To this end it is an object also to provide a novel device which can be used by non-physician technologists readily and accurately to locate the position of the foreign body without resorting to use of complex procedures involving air injection, anesthesia, or the like.

Another object of this invention is to provide a novel localizing device of the type described, which can be used by radiologists to produce special roentgenograms from which the exact location of a foreign body in a person's eye can be calculated mathematically.

A further object of this invention is to provide a novel device of the type described, which has thereon radiopaque indicia that can be projected or superimposed onto roentgenograms for use in calculating the location of a foreign body in a human eye.

Another object of this invention is to provide a novel device of the type described, which is readily applicable to either eye of a person, and which is readily adjustable to suit a variety of facial contours.

Still another object of this invention is to provide on a device of the type described, a linear scale of opaque material, which will be projected upon an X-ray film, and which will automatically compensate for the image magnification inherent in radiographic techniques.

Another object of this invention is to provide a novel localizing device of the type described which is capable of precise alignment with a person's eye, and which incorporates a novel level for assisting in the exact positioning of the device relative to the eye that is to be X-rayed.

Still another object of this invention is to provide an improved localizing device of the type described, which is relatively compact, durable and inexpensive to manufacture, and which obviates the need for using cumbersome charts, graphs or the like in determining the location of a foreign body in a human eye.

Other objects of the invention will be apparent hereinafter from the specification and from the recital of the appended claims, particularly when read in conjunction with the accompanying drawings.

Figure 1:
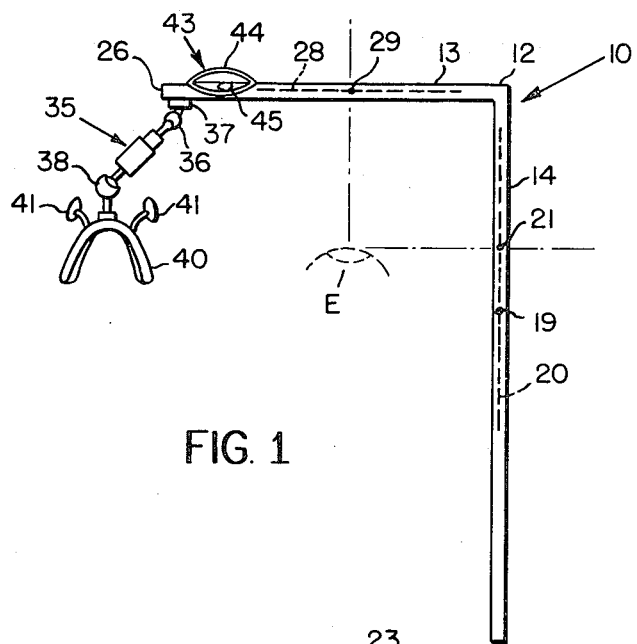
FIG. 1 is a plan view of a localizing or locating device made according to one embodiment of this invention.

Referring now to the drawings by numerals of reference, and first to FIGS. 1 to 3, 10 denotes generally a localizing device comprising a right angular, high-impact, transparent plastic frame 12 having two, plane legs 13 and 14, which intersect one another at right angles. Leg 14, which is slightly longer than leg 13, has parallel upper and lower edges 15 and 16, respectively, which taper slightly inwardly toward one another adjacent the free end 17 of the leg.

Sandwiched or embedded in leg 14 adjacent its forward or wide end (the left end in FIG. 3) are two, intersecting crosshairs or wires 19 and 20, which are made from radiopaque material, such as lead, or the like. Wire 20 is disposed parallel to, and approximately midway between the upper and lower edges 15 and 16 of leg 14; and wire 19 extends between the upper and lower edges 15 and 16 at right angles to wire 20. Also embedded in leg 14 with its midpoint positioned 12 mm. to the left (FIG. 3) or forwardly of wire 19 is an arcuate wire 21, which is also made of radiopaque material. Wire 21 extends transverse to, and is disposed substantially coaxially of, wire 20, and has its convex surface or edge facing in the direction of leg 13.

Adjacent its junction with the leg 14 the leg 13 has parallel upper and lower edges 23 and 24, which are coplanar with the edges 15 and 16, respectively. Remote from leg 14 the edges 23 and 24 taper toward one another to form a rounded point on the free end 26 of leg 13.

Embedded or sandwiched at right angles to one another in the leg 13 are two, radiopaque wires or crosshairs 28 and 29. Crosshair 28, which is disposed parallel to the substantially medially between the edges 23 and 24, lies in a plane common to crosshair 20; and crosshair 29 is disposed parallel to the crosshair or wire 19.

Also embedded in the leg 13 adjacent its upper edge to have its midpoint register with the upper end of the crosshair 29, and extending parallel to edge 23 for approximately 10 mm. beyond opposite sides, respectively, of wire 29, is a millimeter scale 30. This scale comprises a plurality (21 in the embodiment illustrated) of fine, short, radiopaque wires, which extend parallel to one another and to crosshair 29, and which are spaced from one another at 1 mm. intervals. As shown more clearly in FIG. 2, the middle wire 31 of the scale 30 is aligned with the crosshair 29.

A small telescopic rod, which is denoted generally at 35 in FIG. 1, is connected at one end by a conventional ball and socket joint 36 to a small plate 37 that is fastened to the rounded end 26 of the leg 13, and at its opposite end by a further ball and socket joint 38 to a standard, padded nose clamp or support 40. As described hereinafter, the nose clamp 40 is adapted to be disposed over the nasal bridge of the patient to help support the localizer 10 on the head of the patient. Two conventional nose pads 41 project from the nose clamp 40 to help support the latter on the bridge of a person's nose, when in use.

Secured in a shallow recess or dimple formed in the face of leg 13 adjacent its rounded end 26 is a circular level 43, comprising a hollow, generally ellipsoidal housing or bubble 44 containing a droplet 45 of mercury, which is freely movable in the housing. Fixed in the housing 44, for instance embedded in the lower side thereof as illustrated in FIG. 1, are a plurality of concentric, radiopaque wire rings 46 (FIG. 2), which are disposed coaxially about a centerline extending through the housing 44 at right angles to leg 13. Housing 44 is made, for example, from a transparent plastic material so that the droplet 45 of mercury, and the rings 46, are clearly viewable from the exterior of the housing.

In use, and with the patient lying upon his or her back and looking directly upwardly, the device 10 is lowered manually to position the nose clamp 40 over the bridge of the patient's nose, and to position the leg 13 of frame 12 generally horizontally above the eye E (broken lines in FIG. 1) that is to be examined. The operator or technician then peers downwardly at the crosshairs 28 and 29 and manipulates frame 12 relative to clamp 40 to align the intersection of these crosshairs with the optic pupil center of the eye that is being examined. During this adjustment, which is enabled by the telescopic rod 35, the operator also checks to make sure that leg 13 is maintained in a horizontal position. When the leg 13 is in its proper horizontal position, the mercury droplet 45 will be disposed concentrically within the innermost wire ring 46 in the level 43. If the leg 13 is not disposed horizontally, the droplet 45 will, of course, roll to one side or the other of the housing 44, and will traverse one or more of the rings 46 to provide a visual indication that the leg 13 is not level.

When leg 13 has been properly located, and with the patient's head held in a strict anterior-posterior attitude, for example through the use of sandbags or the like to immobilize the patient's head, the operator then views the side of the patient's head through the transparent leg 14 of the frame in order to align the arcuate wire 21 in leg 14 precisely with the foremost arc of the pupil of the injured eye E. After double-checking to make sure leg 13 is still in its proper, level position, the device 10 is fixed in this final position, for example by securing it to the temporal skin of the patient with adhesive tape, or the like.

Two X-ray exposures are now made, one in the anterior-posterior projection with the central ray directed vertically through the crosshairs 28 and 29, and the second with the central ray directed in a cross-table lateral fashion through the center of the crosshairs 19 and 20. Both exposures utilize standard skull technique, which will be readily understood by one skilled in the art. The X-ray films of the two exposures are then developed in the usual manner to produce, for example, roentgenograms of the type illustrated, for example, in FIGS. 4 (vertical) and 5 (lateral).

Figure 4:
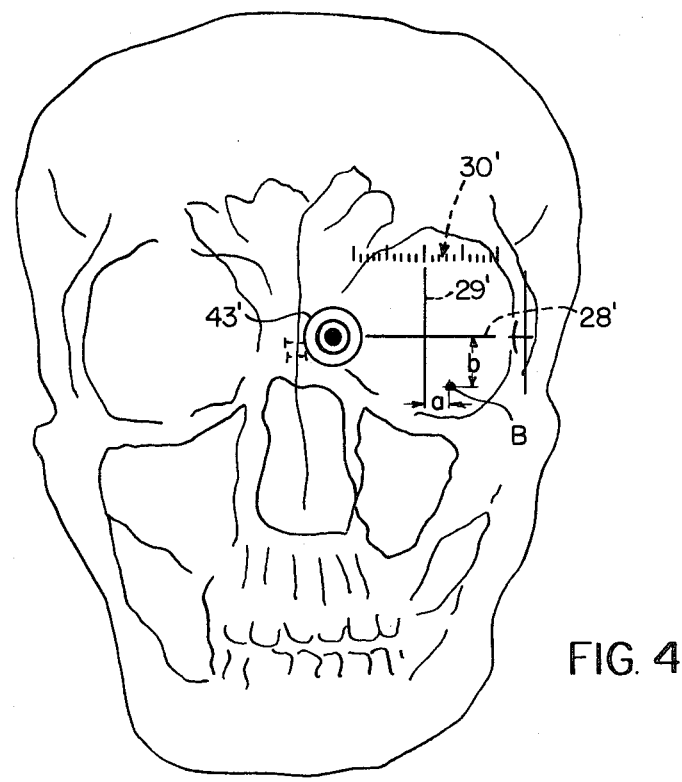
FIG. 4 illustrates a sample roentgenogram of a patient's head with the device of FIGS. 1 to 3 superimposed thereon for use in mathematically determining the position of a foreign body in the left eye of the patient, the X-ray exposure having been taken in the anterior-posterior projection.
Figure 5:
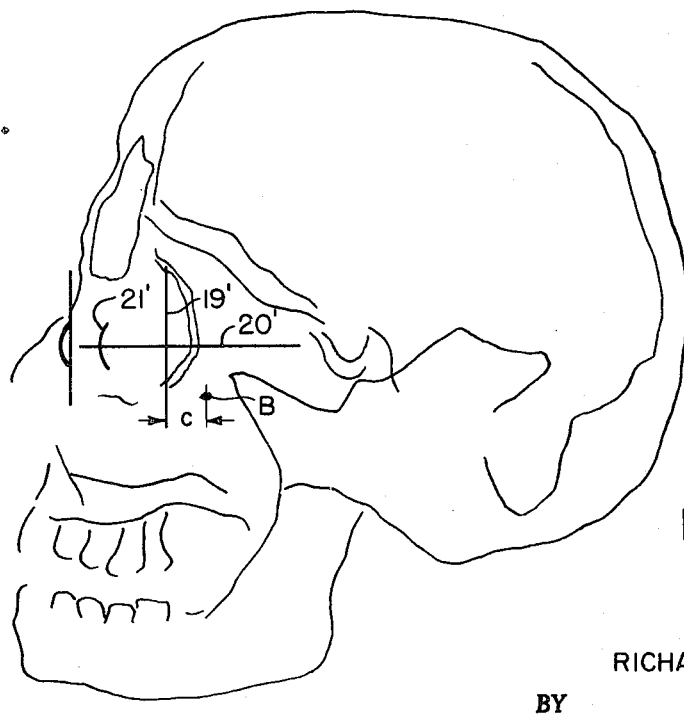
FIG. 5 illustrates a roentgenogram of the same patient but taken in a cross-table, lateral projection.

Referring now to FIGS. 4 and 5, B denotes the foreign body or growth, the exact location of which is sought to be determined by analysis of the X-rays taken of the patient wearing the device 10 as described above. In FIG. 4 numerals 28' and 29' denote the images that were formed on the vertical roentgenogram by the radiopaque crosshairs 28 and 29. Consequently, the intersection of the images 28' and 29' will correspond to the optic pupil center of the patient's eye E. The amount that the body B is actually offset laterally and vertically from the center of the pupil can then be readily determined merely by measuring the distance $a$ from the body to the image 29', and the distance $b$ from the body B to the image 28'. Since the image 30' of the scale 30 has also been formed on this roentgenogram (FIG. 4), the measurement of the distance $a$ is expedited. Moreover, since the image 43' of the level 43 is also formed on this X-ray film, the operator can determine immediately, whether or not the leg 13 was properly disposed in a horizontal position at the time that the anterior-posterior projection was made.

From the roentgenogram illustrated in FIG. 5, the operator can also determine the distance that the body B is spaced in a horizontal direction from the standard midpoint of the patient's optic globe, as represented in the X-ray film by the image 19' of the wire 19. This is done by determining the distance $c$ separating the body B from one side or the other of the image 19' of the crosshair 19.

Having determined measurements $a$, $b$ and $c$, the operator then employs the formula for the diagonal of a cuboid:

$x = \sqrt{a^2 + b^2 + c^2}$, inserting for $a$, $b$ and $c$, in the formula, the corresponding values determined from the analysis of the roentgenograms of FIGS. 4 and 5. A globe radius of 12 mm. is the standard with which the value $x$ is compared. Thus if the sum of the squares of $a$, $b$ and $c$ is greater than 144 mm. (i.e., the square of 12 mm. standard), then the body B lies outside of the optic globe of the eye, and there is therefore no need to operate to remove the body. On the other hand, if the sum of the squares of $a$, $b$ and $c$ is less than 144 (i.e., the value of $x$ is less than 12 mm.), then the operator will know that the foreign body B lies within the optic globe, and should be removed.

Figure 2:
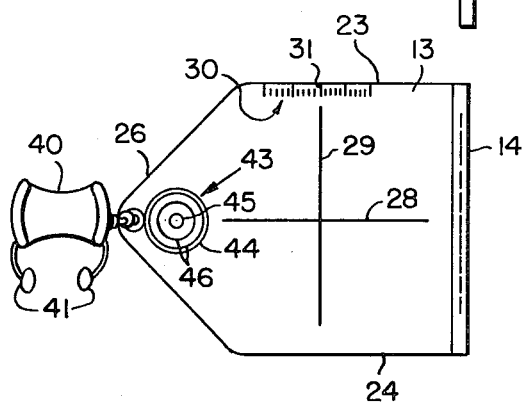
FIG. 2 is a rear elevational view of this device as seen when looking toward the bottom of the device as illustrated in FIG. 1.
Figure 3:
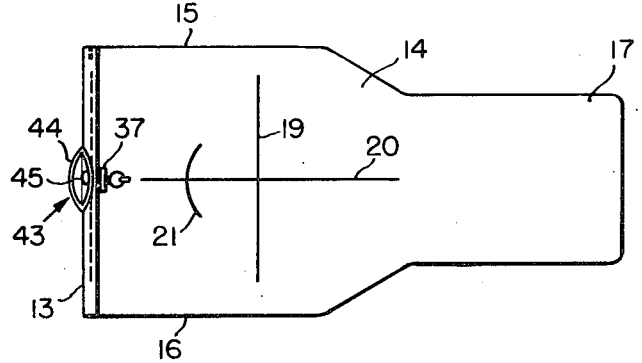
FIG. 3 is a fragmentary side elevational view of this device, with a portion of its nose support cut away for purposes of illustration.
Figure 6:
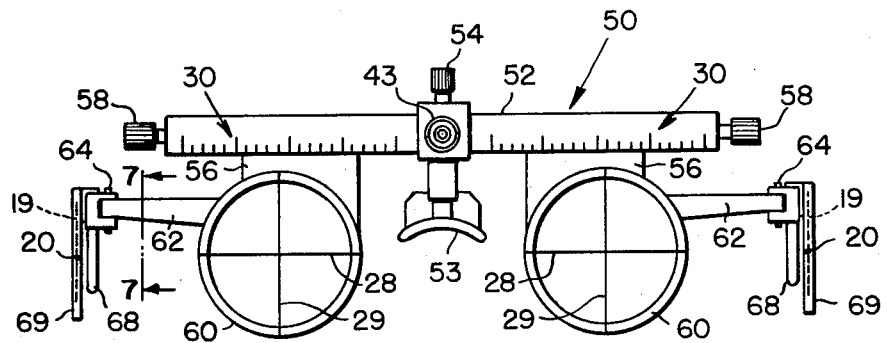
FIG. 6 is a front elevational view of a modified localizing device made in accordance with a second embodiment of this invention.
Figure 7:
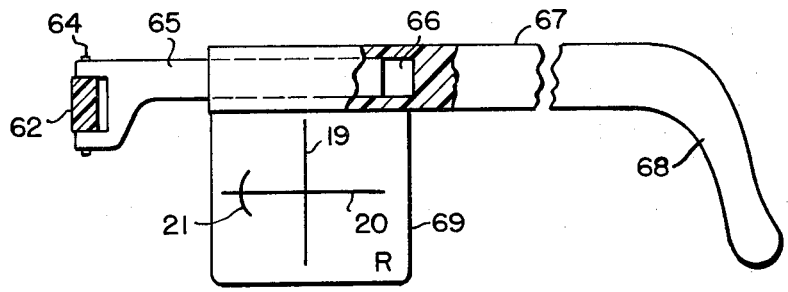
FIG. 7 is an enlarged, fragmentary sectional view taken along the line 7—7 in FIG. 6 looking in the direction of the arrows.

FIGS. 6 and 7, wherein like numerals are employed to denote elements similar to those employed in the embodiment of FIGS. 1 to 3, illustrate a modified localizing device 50, which is designed to be worn by a patient in a manner similar to that of a conventional spectacle frame. This modified device comprises an elongate, tubular front member 52, beneath the midpoint of which a nose pad 53 is mounted in known manner for vertical adjustment relative to member 52 by an externally knurled adjusting nut 54. Two loop-supporting members 56 project at their upper ends through a slot in the bottom of member 52 at opposite sides of the nosepiece 53 for adjustment in a conventional manner longitudinally of member 52 by separate adjusting screws 58, which project from opposite ends, respectively, of member 52. Fastened adjacent their upper ends to members 56 for adjustment therewith longitudinally of member 52 are two, annular or loop-shaped members 60, which are adapted to register with the eyes of the patient when the device 50 is in use. Fastened to the loop members 60, and projecting beyond opposite ends, respectively, of the frame member 52, are two, temple-supporting members 62.

The portion of device 50 thus far described is conventional, and well known to those skilled in the art.

Pivotally attached at its forward end by a pin 64 to the outer end of each member 62 is a temple supporting arm 65. At its opposite end each arm 65 is slidable in axial bore 66 formed in the forward end of a temple member 67, the rear end of which is curved as at 68 in the usual manner to support the temple over the ear of the person wearing the device 50. Secured at its upper edge to each member 67 for adjustment therewith relative to the front frame member 52 is a rectangular, transparent plate 69 of plastic, glass, or the like.

Embedded in each of the plates 69 are two, radiopaque wires or crosshairs 19 and 20, which, as in the case of the first embodiment, intersect with one another at right angles. Each plate 69 also contains an arcuate, radiopaque wire 21, which extends transverse to the associated wire 20, and which is spaced to the left or forwardly of the associated wire 19 as illustrated in FIG. 7.

Two radiopaque wires or crosshairs 28 and 29 are also secured at opposite ends thereof to each of the loop members 60 to extend at right angles to one another in a manner similar to the crosshairs 28 and 29 of the first embodiment. Also, as in the first embodiment, the crosshairs 28 lie in a plane containing the crosshairs 20, and extend parallel to the frame member 52; while the crosshairs 19 and 29 extend parallel to one another, and at right angles to member 52.

Mounted on the face of frame member 52 centrally thereof is a level 43 of the type disclosed in the first embodiment. Also secured to the face of member 52 at opposite sides, respectively, of its midpoint are a plurality of equi-spaced, relatively short, radiopaque wires, which define on member 52 above each member 60 a scale 30 of the type disclosed in the first embodiment.

In use, device 50 is lowered onto the supine patient's face with the curved ends 68 of the temples 67 disposed over the tops of the ears of the patient in the manner of a conventional spectacle frame. The screw 54 is then rotated, if necessary, to adjust the nosepad 53 until the level 43 indicates that the frame member 52 is disposed properly in a horizontal or level position. Then, depending upon which eye of the patient is to be examined, one of the screws 58 is adjusted to place the intersection of the crosshairs 28 and 29 of the associated member 60 in alignment with the optic pupil center of the eye; after which the associated temple 67 is adjusted axially on its supporting arm 65 to place the associated arcuate wire 21 on the attached plate 69 precisely in alignment with the foremost arc of the pupil of the injured eye. Thereafter the anterior-posterior and lateral X-ray projections are made in a manner similar to that described above to produce the two roentgenograms necessary for calculating the distances $a$, $b$ and $c$ necessary to determine the location of the foreign body relative to the optic globe.

When a lateral X-ray is taken of a patient wearing the device 50, images of the wires 19, 20 and 21 of both plates 69 will be superimposed on the same roentgenogram. To assist the operator in distinguishing between these superimposed images, the two plates 69 may be marked adjacent lower corners thereof with radiopaque letters L (not illustrated) and R (FIG. 7), respectively, to denote the wires associated with the left and right eye, respectively, of the patient. Alternatively the set of wires 19, 20 and 21 on one of the two plates 69 could be designed to produce broken line images, and the other set solid line images; or each plate 69 could be hinged adjacent its upper edge to the associated temple 67 to be swung into an inactive or horizontal position, as viewed in FIG. 6, when not in use.

From the foregoing it will be apparent that applicant has devised a relatively simple and accurate method for determining the exact location of a foreign body in a human eye. By using one of the novel localizing devices disclosed herein, even a non-physician technologist can diagnose the injury to determine rapidly and accurately whether or not surgery will be necessary. Moreover, this invention obviates the need to resort to the use of air injection, anesthesia or other more sophisticated procedures for locating a foreign object in an eye relative to its optic globe. Furthermore, by utilizing a novel circular level of the type disclosed herein, the accuracy of the device employed is considerably increased, since an image of the level is reproduced on one of the two roentgenograms that is used in the diagnosis, whereby the operator can tell at a glance whether or not the device was properly mounted on the patient at the time the X-ray exposures were taken.

While in the embodiments illustrated it has been suggested that the various radiopaque wires employed be embedded or sandwiched in the frame 12 and plates 69, it will be readily apparent to one skilled in the art that the particular manner in which the wires are incorporated or secured to their associated members, is merely a matter of choice. Such wires, for example, could be secured to the outer surface of the associated supporting member, if desired; and such supporting member may be made of any transparent material or framework capable of supporting the wires in registry with the axis and foremost arc of the pupil of the injured eye in the manner described herein.

Having thus described my invention, what I claim is:

1. A device for use in conjunction with an X-ray machine for locating the position of a foreign body in a person's eye relative to the optic globe of the eye, comprising a frame having a front section and a side section extending transverse to said front section, a pair of radiopaque crosshairs mounted on said front section to extend transverse to one another, a third, radiopaque crosshair mounted on said side section parallel to one of said pair of crosshairs, means for adjustably mounting said frame on a person's head with said pair of crosshairs registering with the axis of the pupil of an eye of said person, and with said third crosshair disposed a predetermined distance rearwardly of the foremost arc of the pupil of said eye, and transverse to the axis of said pupil, an arcuate, radiopaque member mounted on said side section for registry with said foremost arc of said pupil of the person on whom said frame is mounted, and having its concave surface confronting and spaced from said third crosshair, a transparent housing secured to said frame and having in one end thereof an arcuate recess the axis of which extends at right angles to a plane containing said pair of crosshairs, a plurality of radially spaced, concentric, radiopaque rings secured in said housing coaxially of the last-named recess, and a drop of mercury mounted in said housing for movement relative to said rings, and disposed to rest concentrically of said rings, when said pair of crosshairs is disposed horizontally.

2. A device for use in conjunction with an X-ray machine for locating the position of a foreign body in a person's eye relative to the optic globe of the eye, comprising a frame having a front section and a side section extending transverse to said front section, a pair of radiopaque crosshairs mounted on said front section to extend transverse to one another, a third, radiopaque crosshair mounted on said side section parallel to one of said pair of crosshairs, means for adjustably mounting said frame on a person's head with said pair of crosshairs registering with the axis of the pupil of an eye of said person, and with said third crosshair disposed a predetermined distance rearwardly of the foremost arc of the pupil of said eye, and transverse to the axis of said pupil, an arcuate, radiopaque member mounted on said side section for registry with said foremost arc of said pupil of the person on whom said frame is mounted, and having its concave surface confronting and spaced from said third crosshair, said front and side sections of said frame comprising a pair of transparent plates secured to and intersecting one another at right angles, said pair of crosshairs comprising a first radiopaque wire secured to one of said plates to extend at right angles to the other plate, and a second radiopaque wire secured to said one plate to extend at right angles to said first wire and parallel to said other plate, said third crosshair comprising a third radiopaque wire secured to said other plate parallel to said second wire, a droplet of mercury mounted in a transparent housing on said one plate for rolling movement into and out of a central position in which it is disposed coaxially of a circular recess in one end of said housing, when said one plate is disposed horizontally, and a plurality of radially spaced, radiopaque wire rings mounted concentrically in said housing coaxially of said recess to surround said droplet, when the latter is in its central position.

3. A device for use in conjunction with an X-ray machine for locating the position of a foreign body in a person's eye relative to the optic globe of the eye, comprising a frame having a front section and a side section extending transverse to said front section, a pair of radiopaque crosshairs mounted on said front section to extend transverse to one another, a third, radiopaque crosshair mounted on said side section parallel to one of said pair of crosshairs, means for adjustably mounting said frame on a person's head with said pair of crosshairs registering with the axis of the pupil of an eye of said person, and with said third crosshair disposed a predetermined distance rearwardly of the foremost arc of the pupil of said eye, and transverse to the axis of said pupil, an arcuate, radiopaque member mounted on said side section for registry with said foremost arc of said pupil of the person on whom said frame is mounted, and having its concave surface confronting and spaced from said third crosshair, said front and side sections of said frame comprising a pair of transparent plates secured to and intersecting one another at right angles, said pair of crosshairs comprising a first radiopaque wire secured to one of said plates to extend at right angles to the other plate, and a second radiopaque wire secured to said one plate to extend at right angles to said first wire and parallel to said other plate, said third crosshair comprising a third radiopaque wire secured to said other plate parallel to said second wire, said mounting means comprising a telescopic member coupled at one end to said one plate for universal movement relative thereto, and a generally U-shaped nose clamp coupled intermediate its ends to the opposite end of said telescopic member for universal movement relative thereto, and adapted to have its open end positioned removably over the bridge of the nose of the person upon which the device is to be mounted, thereby to support said one plate in front of said one eye with said other plate extending rearwardly adjacent the person's temple.

4. A device
for use in conjunction with an X-ray machine for locating the position of a foreign body in a person's eye relative to the optic globe of the eye, comprising a frame having a front section and a side section extending transverse to said front section, a pair of radiopaque crosshairs mounted on said front section to extend transverse to one another, a third, radiopaque crosshair mounted on said side section parallel to one of said pair of crosshairs, means for adjustably mounting said frame on a person's head with said pair of crosshairs registering with the axis of the pupil of an eye of said person, and with said third crosshair disposed a predetermined distance rearwardly of the foremost arc of the pupil of said eye, and transverse to the axis of said pupil, an arcuate, radiopaque member mounted on said side section for registry with said foremost arc of said pupil of the person on whom said frame is mounted, and having its concave surface confronting and spaced from said third crosshair, two annular members suspended from said front section for adjustment longitudinally thereof to register with the eyes of a patient, said side section being one of two temples, which are pivotally connected to said annular members for adjustment therewith relative to said front section, and disposed to extend along opposite sides of a patient's head and over the ears thereof, said pair of radiopaque crosshairs comprising one of two pairs of radiopaque wires, each of said two pairs of wires being secured at right angles to one another across the central opening in one of said annular members, two transparent members secured to said temples to be supported thereby adjacent opposite sides of a patient's head in registry with the templar areas thereof, said third crosshair being one of two, further radiopaque wires, each of which is secured to one of said two transparent members to extend parallel to one each of said two pairs of wires, and at right angles to said front section, and said arcuate member comprising one of two, arcuate, radiopaque wires, which are secured, respectively, to said two transparent members with the concave surfaces thereof disposed in spaced, confronting relation to said two further wires.

5. A device as defined in claim 4, including means mounting said transparent members for adjustment longitudinally of said temples toward and away from, respectively, said front section.

* * * * *